United States Patent [19]

Mitamura et al.

[11] Patent Number: 5,583,230

[45] Date of Patent: Dec. 10, 1996

[54] POLYMERIZABLE COMPOUND HAVING MILDEW RESISTANCE AND POLYMER THEREOF

[75] Inventors: Hideyuki Mitamura; Yoshikazu Arimatsu, both of Shiga-ken, Japan

[73] Assignee: Toyo Boseki Kabushiki Kaisha, Osaka, Japan

[21] Appl. No.: 86,905

[22] Filed: Jul. 7, 1993

Related U.S. Application Data

[60] Continuation of Ser. No. 533,766, Jun. 6, 1990, abandoned, which is a division of Ser. No. 268,956, Nov. 9, 1988, Pat. No. 4,956,431, which is a continuation-in-part of Ser. No. 111,801, Oct. 23, 1987, abandoned.

[30] Foreign Application Priority Data

| Oct. 24, 1986 | [JP] | Japan | 61-254411 |
| Nov. 4, 1986 | [JP] | Japan | 61-263128 |
| Nov. 4, 1986 | [JP] | Japan | 61-263129 |
| Apr. 30, 1987 | [JP] | Japan | 62-108237 |

[51] Int. Cl.$^6$ ........................ C07D 213/70; C07C 43/70; C07C 321/28
[52] U.S. Cl. ................ 546/153; 546/290; 548/181; 548/209; 548/213; 568/48; 568/648
[58] Field of Search ................... 546/290, 153; 568/48, 648; 548/181, 209, 213

[56] References Cited

U.S. PATENT DOCUMENTS

| 3,058,953 | 10/1962 | McMaster | 260/47 |
| 4,050,921 | 9/1977 | Plant et al. | 71/94 |
| 4,115,297 | 9/1978 | Bolto | 521/32 |
| 4,834,904 | 5/1989 | Krause et al. | 252/299.01 |

OTHER PUBLICATIONS

Chemical Abstract vol. 106, No. 1815p, Akelah et al, 1986, "Investigation of pentachlophenol polymer for controlled release of pesticide".

Primary Examiner—C. Warren Ivy
Assistant Examiner—Raymond Covington
Attorney, Agent, or Firm—Foley & Lardner

[57] ABSTRACT

A novel mildew resistant polymerizable compound of the formula:

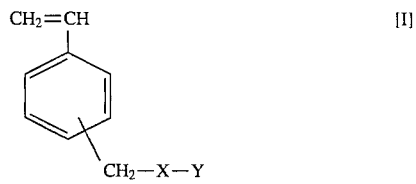

wherein X is —O— or —S—; and Y is a residue of a known mildew proofing compound, preferably, a residue of a compound selected from the group consisting of phenol substituted with 1 to 5 halogen atoms, p-chloro-m-cresol, o-phenylphenol, p-chloro-m-xylenol, salicylanilide, 8-hydroxyquinoline, 2-(4'-thiazolyl)benzimidazole, 2,5-dibromo-4-methylaniline, 1,2-benzoisothiazolin-3-one and 2-pyridinethiol-1-oxide. A polymer of the compound [I] and polyurethane composition containing the polymer are also disclosed.

4 Claims, 7 Drawing Sheets

POLYMERIZABLE COMPOUND HAVING MILDEW RESISTANCE AND POLYMER THEREOF

This application is a continuation of Ser. No. 07/533,766, filed Jun. 6, 1990 now abandoned, which is a divisional of Ser. No. 07/268,956, filed Nov. 9, 1988, U.S. Pat. No. 4,956,431, which is a continuation-in-part of Ser. No. 07/111,801, filed Oct. 23, 1987, abandoned.

FIELD OF THE INVENTION

The present invention relates to a novel polymerizable compound which is useful for a mildew proofing agent or a raw material of a mildew resistant polymer. The present invention also relates to a mildew resistant polymer produced from the novel polymerizable compound and a polyurethane composition containing the mildew resistant polymer which has improved resistant to microorganisms.

BACKGROUND OF THE INVENTION

In order to prevent growth of mildew on various products, fixtures and the like, there have been employed addition of mildew proofing agents such as those disclosed in H. Horiguchi, "Bokin Bobai no Kagaku " published by Sankyo Shuppan (1982), or coating treatment with paints containing mildew proofing agents. From an ideal viewpoint a mildew proofing agent should have such properties that it is harmless to man and beast and very efficacious on mildew and is readily dissolved or dispersed in a product, but it is slightly soluble in water and nonvolatile. However, such a mildew proofing agent is not yet actually obtained and, usually, efficacy of a mildew proofing agent is lost due to agglomeration in a product, migration and the like. On the other hand, in Journal of Coatings Technology, 50, [636] 49; [639] 62 (1978), there is proposed a mildew resistant polymer obtained by using a monomer to which a mildew proofing agent is chemically attached to a monomer. However, its efficacy as a mildew proofing agent is still insufficient.

On the other hand, synthetic elastomers such as polyurethane elastomer have excellent wear resistance, oil resistance, freeze resistance, chemical resistance, mechanical strength and the like. Therefore, they are molded into fibers, films and other articles and used in various fields. However, they have drawbacks such as they cause deterioration and discoloration due to environmental conditions and action of microorganisms. Although, in Japanese Patent Kokai No. 59-211678, Japanese Patent Kokoku Nos. 60-44423, 60-212415 and 61-98706, there is proposed to add an anti-fungus agent or a mildew proofing agent to product during a post-treatment to prevent deterioration and discoloration by microorganisms, these agents are still insufficient from the view points of mildew proofing effect and its durability.

OBJECTS OF THE INVENTION

One object of the present invention is to provide a polymerizable compound which is suitable for a mildew proofing agent and free from the above drawbacks in a conventional mildew proofing agent. That is, the present invention is to provide a polymerizable compound suitable for a mildew proofing agent which is harmless to man and beast, non-volatile and slightly soluble in water and has good durability in a product.

Another object of the present invention is to provide a mildew proofing agent having good mildew resistance and improved durability which can be readily dissolved in a product and is non-volatile and slightly soluble in water.

Still another object of the present invention is to provide a polyurethane composition free from the above drawbacks in a conventional composition. That is, the present invention is to provide a polyurethane composition having resistance to microorganisms wherein deterioration and discoloration due to microorganisms are improved.

These objects as well as other objects and advantages of the present invention will become apparent to those skilled in the art from the following description with reference to the accompanying drawings.

SUMMARY OF THE INVENTION

Figure 1:
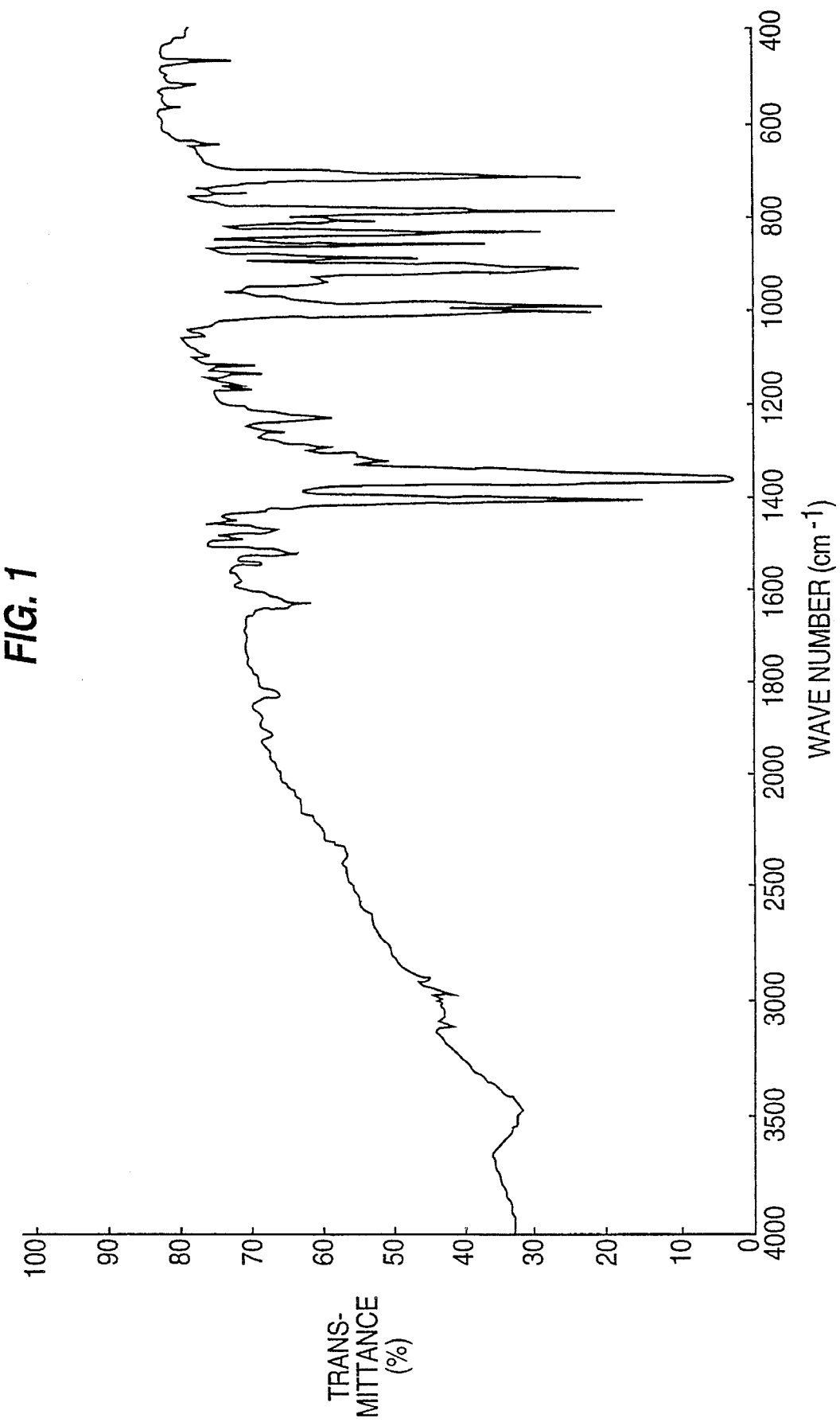
FIGS. 1 and 2 are IR and NMR spectra of one of the polymerizable compounds of the present invention, (2,3,4,5,6-pentachlorophenyloxy)methylstyrene obtained in Example 1 hereinafter, respectively.

According to one aspect of the present invention, there is provided a novel polymerizable compound of the formula:

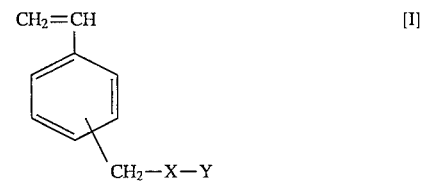

wherein X is —O— or —S—; and X-Y is a residue of known mildew proofing compound, preferably, a residue of a compound selected from the group consisting of phenol substituted with 1 to 5 halogen atoms, p-chloro-m-cresol, o-phenylphenol, p-chloro-m-xylenol, salicylanilide, 8-hydroxyquinoline, 2-(4'-thiazolyl)benzimidazole, 2,5-dibromo-4-methylaniline, 1,2-benzoisothiazolin-3-one or 2-pyridinethiol-1-oxide.

In another aspect of the present invention, there is provided a mildew resistant polymer comprising a repeating unit of the formula:

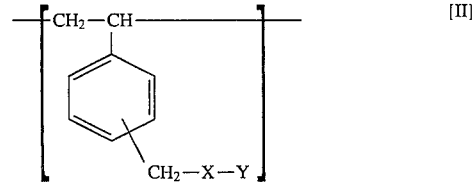

wherein —X-Y is a residue as defined above. Specifically preferred are polymers wherein X-Y is 8-hydroxyquinoline, 2-(4'-thiazolyl)benzimidazole, 2,5-dibromo-4-methylaniline, 1,2-benzoisothiazolin-3-one or 2-pyridinethiol-1-oxide.

In still another aspect of the present invention, there is provided a polyurethane composition comprising a polyurethane and a polymer containing a repeating unit of the above formula [II].

DETAILED DESCRIPTION OF THE INVENTION

In the novel polymerizable compound of the formula [I], preferably, the group containing the residue of a mildew proofing compound is located at m- or p-position of the benzene ring. Preferred examples of the compound of the formula [I] include compounds of the formulas:

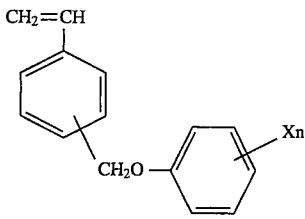
[Ia]

wherein X is bromo or chloro; and n is 1 to 5; and

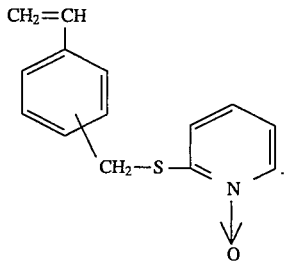
[Ib]

In the compound of the formula [Ia], the halogen atom is preferably chlorine. Preferably, n is 5, that is, the pentachloro compound is preferred.

The compound of the formula [Ia] can be prepared by, for example, reacting chloromethylstyrene (it may be a mixture of m- and p-chloromethylstyrene or p-chloromethylstyrene alone) with a corresponding mildew proofing compound or its reactive derivative such as sodium chlorophenate. This reaction can be carried out in the presence of a solvent such as water and ethanol. When sodium pentachlorophenate is used, the reaction is represented by the following scheme:

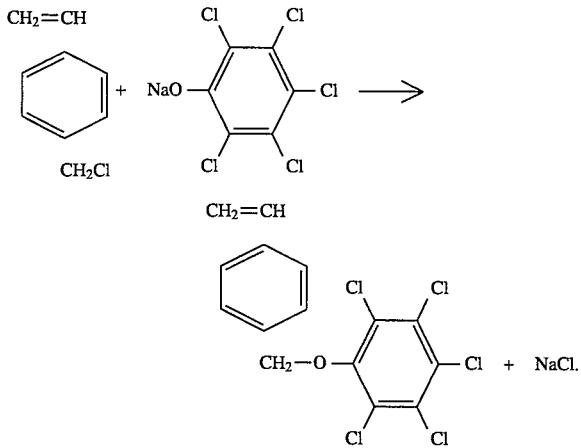

The compound of the formula [Ib] can be prepared by, for example, reacting chloromethylstyrene (it may be a mixture of m- and p-chloromethylstyrene or p-chloromethylstyrene alone) with the mildew proofing compound, sodium-2-pyridinethiol-1-oxide. This reaction can be carried out in the presence of a solvent such as water and ethanol. This reaction is represented by the following scheme:

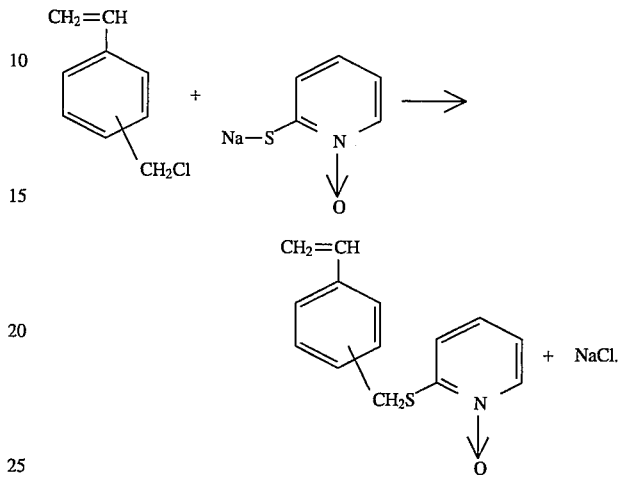

The polymerizable compound of the present invention has mildew resistance, and it can be used for imparting mildew resistance to molded articles such as sheets, films, fibers and the like by incorporating the compound in the form of a monomer or a polymer thereof into the article before or after molding.

When using the compound in the form of a monomer, it is preferred to polymerize it in a molded article. When using the compound in the form of a polymer, it can be used as a polymer blend or can be coated on an article.

In the formula [II] of the mildew resistant polymer of the present invention, the group containing the residue of a mildew proofing compound may be located at m- or p-position and the repeating units may be a mixture of both m- and p-units, or the p-units alone. As a polymerization method, there can be employed a conventional polymerization such as emulsion polymerization, solution polymerization or the like, and there can be used a polymerization solvent and an initiator suitable for a particular polymerization.

The mildew resistant polymer of the present invention can be prepared by, for example, polymerizing the mildew resistant monomer of the formula [I] directly, or copolymerizing the mildew resistant monomer of the formula [I] with one or more other polymerizable monomer. Alternatively, the mildew resistant polymer of the present invention can be prepared by introducing the group containing the residue of a mildew proofing compound into a homopolymer of chloromethylstyrene, or introducing the group containing the residue of a mildew proofing compound into a copolymer of chloromethylstyrene. The concentration of the mildew resistant component in the polymer can be adjusted by controlling polymerization conditions. On the other hand, the molecular weight of the polymer can be also adjusted by controlling polymerization conditions (e.g., monomer concentration, catalyst concentration, etc.). However, preferably, the polymer has a molecular weight of about 1,000 to 70,000.

The mildew resistant polymer of the present invention can be used in the form of, for example, liquid, emulsion, suspension, paste, powder, particles, sheets, films, molded articles, porous films, fibers, paper, plastics, or inorganic plates. Alternatively, it can be used by blending into or coating on sheets, films, molded articles, porous films, paper, fibers, plastics, inorganic plates or the like.

Particularly, the mildew resistant polymer is useful for a mildew proofing agent of elastomer fibers. Such elastomer fibers include those obtained by spinning a polyurethane elastomer, a polyester elastomer, a polycarbonate elastomer, a polyamide elastomer or the like according to a conventional method such as dry spinning, melt spinning or the like, and optionally subjecting the resulting filaments to stretching, heat treatment and the like. Further, they may be conjugate fibers obtained by spinning an elastomer and a non-elastomer. Preferably, the mildew resistant polymer can be added to a polymer or a polymer dope at any step before spinning. The amount of the mildew resistant component in the fibers are at least 0.001% by weight, preferably 0.01 to 1% by weight. Further, additives such as light stabilizers, thermal oxidative degradation proofing agents, gas discoloration proofing agents, dyes, pigments, metallic soaps, lubricants, other mildew proofing agents can be added to or coated on the elastomer fibers.

The polyurethane composition of the present invention comprises the above mildew resistant polymer and a polyurethane.

The molecular weight of the mildew resistant polymer is preferably 1,000 to 70,000. When the molecular weight is less than 1,000, scum is formed during molding, or insufficient durability results. On the other hand, when the molecular weight is more than 70,000, solubility of the polymer is lowered and it is difficult to obtain a polyurethane composition having excellent resistance to microorganisms.

Preferably, the composition contains at least 0.00% by weight, more preferably, 0.01 to 1% by weight of the mildew resistant component (i.e., the repeating unit of the formula [II]). Therefore, preferably, the polymer to be incorporated into the composition contains a corresponding amount of the mildew resistant component. The polymer can be added to a polyurethane at any stage of the production of the polyurethane. However, it is preferred to blend the polymer with a polyurethane after completion of polymerization of the polyurethane but before molding.

The polyurethane used in the composition of the present invention is an elastomeric polymer containing urethane bonds in the molecule thereof obtained by reacting a diisocyanate with a substantially linear compound having hydroxyl groups at both terminal ends and a multi-functional compound containing active hydrogen atoms as a chain extender.

Examples of the *diisocyanate include 4,4'-diphenylmethane diisocyanate, 1,5-naphthalene di isocyanate, 1,4-diphenylene diisocyanate, 2,4-tolylene diisocyanate, hexamethylene diisocyanate, 1,4-cyclohexane diisocyanate, 4,4'-dicyclohexylmethane diisocyanate, isophorone diisocyanate and the like. These diisocyanates can be used alone or in combination thereof. 4,4'-Diphenylmethane diisocyanate is preferred.

The linear compound is preferably has a molecular weight of 600 to 7,000 and examples thereof include polytetramethylene ether diol, polycaprolactone diol, a polyester diol having a melting point of not higher than 60° C., preferably not higher than 40° C., obtained by reacting one or more glycols such as ethylene glycol, 1,4-butanediol, 1,6-hexanediol, neopentyl glycol and the like with one or more aliphatic dicarboxylic acids such as succinic acid, glutaric acid, adipic acid, suberic acid, azelaic acid, sebacic acid, dodecanedicarboxylic acid, beta-methyladipic acid, hexahydroterephthalic acid and the like. The aliphatic dicarboxylic acids may partly contain aromatic dicarboxylic acids such as terephthalic acid, isophthalic acid and the like. These compounds can be used alone or in combination thereof.

Examples of the multi-functional compound include polyamines such as hydrazine, ethylenediamine, 1,2-propylenediamine, hexamethylenediamine, xylylenediamine, 4,4'-diaminophenylmethane and the like, 4, 4'-diphenylmethane disemicarbazide, beta-aminopropionic acid hydrazide, carbohydrazide, water, ethylene glycol, 1,4-butanediol and the like. These compounds can be used alone or in combination thereof.

Preferably, the polyurethane is a polyester polyurethane.

The process for preparing a polyurethane is not limited to a specific one and a conventional process can be employed. For example, an organic diisocyanate is reacted with a polymer diol in the presence or absence of a conventional solvent to obtain a prepolymer having isocyanate groups at both terminal ends (a reaction accelerator, a reaction inhibitor and the like can be used) and then the resulting prepolymer is reacted with a bifunctional active hydrogen containing chain extender in a liquid state. The preparation can be carried out by reacting all the ingredients in a single step, or reacting the ingredients in several separate steps. A terminator such as a monofunctional compound (e.g., a monoamine) may be used during or at the end of the polymerization reaction.

Optionally, in the composition of the present invention, there can be added additives such as anitoxidants, for example, hindered phenol anitoxidants, hindered amine antioxidants and the like; and/or ultraviolet light absorbers, for example, benztriazole ultraviolet light absorbers.

Further, optionally, there can be added other additives such as inorganic particles, for example, barium sulfate, silicates, zinc oxide and the like; anti-block agents, for example, calcium stearate, magnesium stearate, polytetrafluoroethylene, organopolysiloxane and the like; other mildew proofing agents; colorants; and the like.

The polyurethane composition of the present invention thus obtained can be molded in the form of fibers, tapes, films and the like by conventional methods such as dry, wet and melt molding. Further, it can be utilized as foams, elastomers, synthetic leathers, paints and the like.

Preferably, the polyurethane composition of the present invention is in the form of elastomer fibers, i.e., polyurethane elastomer fibers obtained by a conventional method as described above.

The following Examples and Comparative Examples further illustrate the present invention in detail but are not to be construed to limit the scope thereof. All "%'s" and "parts" in the Examples and Comparative Examples are by weight unless otherwise stated.

Properties in Examples and Comparative Examples were measured as follows.

(1) Mildew resistance test (JIS Z 2911)

A test piece or a sample was placed on an agar plate containing inorganic salts in a petri dish. A spore suspension of the prescribed four mold strains was sprayed on the plate and it was incubated at 27±1° C. for 14 days. After incubation, mildew resistance was evaluated according to the following criteria.

| Mildew resistance | Growth of hyphae |
|---|---|
| 3 | No growth of hypha is observed around the test piece or the sample. |
| 2 | Growth of hyphae is observed around the test piece or the sample. The hyphae growth area does not exceed one third of the total area. |
| 1 | Growth of hyphae is observed around the test piece or the sample. The hyphae growth area exceeds one third of the total area. |

(2) Retention of remaining tenacity after mildew resistance test

After mildew resistance test, the test piece was untangled to obtain filaments and a remaining tenacity was measured by using Autograph IM-100 manufactured by Shimazu Seisaku-sho, Japan. In comparison with a tenacity of untreated filaments, the retention of remaining tenacity was calculated by the following equation:

$$\text{Retention of remaining tenacity} = \frac{\text{Tenacity of filaments after test}}{\text{Tenacity of untreated filaments}} \times 100 \, (\%)$$

(3) Discoloration test after mildew resistance test b-Values of the test piece were measured before and after mildew resistance test by using ND-101D differential colorimeter manufactured by Nippon Denshoku Kogyo, Japan and the degree of discoloration was expressed as the difference between the values (Δb) values.

EXAMPLE 1

In a 500 ml four necked flask equipped with a stirrer, a thermometer and a nitrogen gas inlet, chloromethylstyrene (m/p=60/40) (25 g, 0.161 mole) was dissolved in ethanol (50 ml) at room temperature. A solution of sodium pentachlorophenate (hereinafter abbreviated as Na-PCP) (49 g. 0.170 mole) in a mixed solvent of water/ethanol (1/1, 250 ml) was gradually added dropwise thereto and, after completion of addition, the mixture was reacted at 50° C. for 1 hour. The mixture was cooled and the resulting precipitate was filtered off. The filtrate was concentrated with a rotary evaporator. Then, n-hexane (250 ml) and distilled water (100 ml) were added to the concentrated solution and the mixture was shaken. The aqueous layer was removed and additional distilled water (100 ml) was added. This procedure was repeated to remove unreacted Na-PCP. The hexane layer was evaporated with a rotary evaporator. Then, the solid residue was recrystallized from acetone to obtain (2, 3, 4, 5, 6-pentachlorophenyloxy)methylstyrene of the formula [Ia] as white needle crystals, m.p. 113°–115° C., yield 85%.

Figure 2:
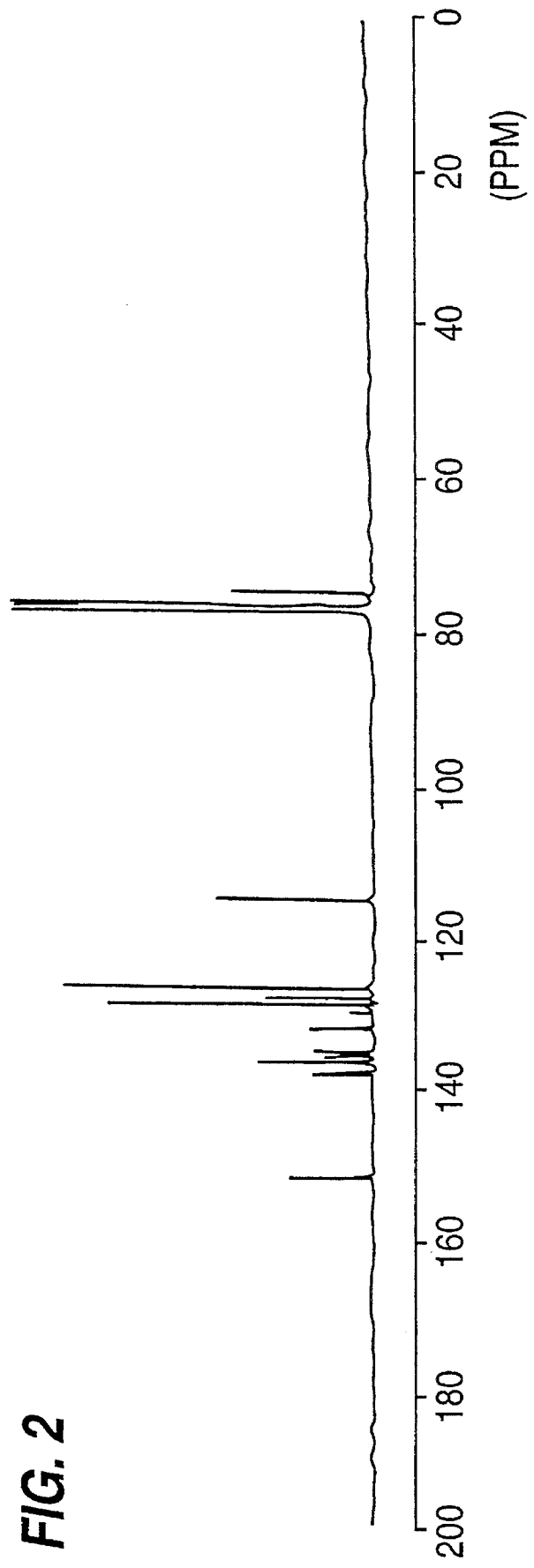

IR and $^{13}$C-NMR spectra of the compound thus obtained are shown in FIGS. 1 and 2, respectively.

EXAMPLE 2

According to the same manner as described in Example 1, white needle crystals of m.p. of 143°–145° C. were obtained (yield 83%) except that p-chloromethylstyrene was used instead of the mixture of m- and p-chloromethylstyrene. From the elemental analysis and IR and $^{13}$C-NMR spectra, the resulting compound was identified as (2, 3, 4, 5, 6-pentachlorophenyloxy)methylstyrene.

The results of the elemental analysis of the compounds obtained in Examples 1 and 2 are shown in Table 1.

TABLE 1

| | Elemental analysis (%) | | | |
|---|---|---|---|---|
| | C | H | O | Cl |
| Calcd. | 47.10 | 2.35 | 4.18 | 46.34 |
| Found | | | | |
| Example 1 | 46.88 | 2.13 | 4.12 | 46.22 |
| Example 2 | 47.02 | 2.12 | 4.33 | 46.22 |

Mildew resistance test according to JIS-Z-2911 was carried out by using (2, 3, 4, 5, 6-pentachlorophenyloxy)methylstyrene of Examples 1 and 2 and, as comparative compounds, Zincomazine® and Na-PCP. The results are shown in Table 2.

TABLE 2

| | Mildew resistance |
|---|---|
| Example 1 | 3 |
| Example 2 | 3 |
| Zincomazine ® | 3 |
| Na-PCP | 3 |

As seen from Table 2, no decrease in mildew resistance of the compound of the present invention is observed in comparison with the comparative compounds which are known mildew resistant compounds. Since the compound of the present invention can be polymerized in an organic solvent in the presence of 2,2'-azobis-iso-butyronitrile as a catalyst, it can be utilized as a polymerizable monomer in various industrial applications.

EXAMPLE 3

In a 300 ml four necked flask equipped with a stirrer, a thermometer and a nitrogen inlet, chloromethylstyrene (m/p=60/40) (50 g, 0.328 mole) was dissolved in ethanol (50 ml) at room temperature. A solution of sodium 2-pyridinethiol-1-oxide (Na-OM) in water (125 g, 0.336 mole) was gradually added dropwise thereto with stirring and, after completion of addition, the mixture was reacted at 50° C. for 1 hour. The mixture was cooled and the resulting precipitate was filtered off. The filtrate was concentrated with a rotary evaporator. n-Hexane (250 ml) and distilled water (100 ml) were added to the concentrated solution and the mixture was shaken. After removal of the aqueous layer, additional distilled water (100 ml) was added and the same procedure was repeated to remove unreacted Na-OM. The n-hexane layer was evaporated with a rotary evaporator. The residual solid was recrystallized from acetone to obtain the compound of the formula [Ib] as pale yellow needle crystals, m.p. 98°–101° C., yield 90%.

Elemental analysis Calcd.(%): C, 69.14; H, 5.35; S, 13.17; N, 5.76 Found (%): C, 68.92; H, 5.29; S, 13.27, N, 5.66

Figure 3:
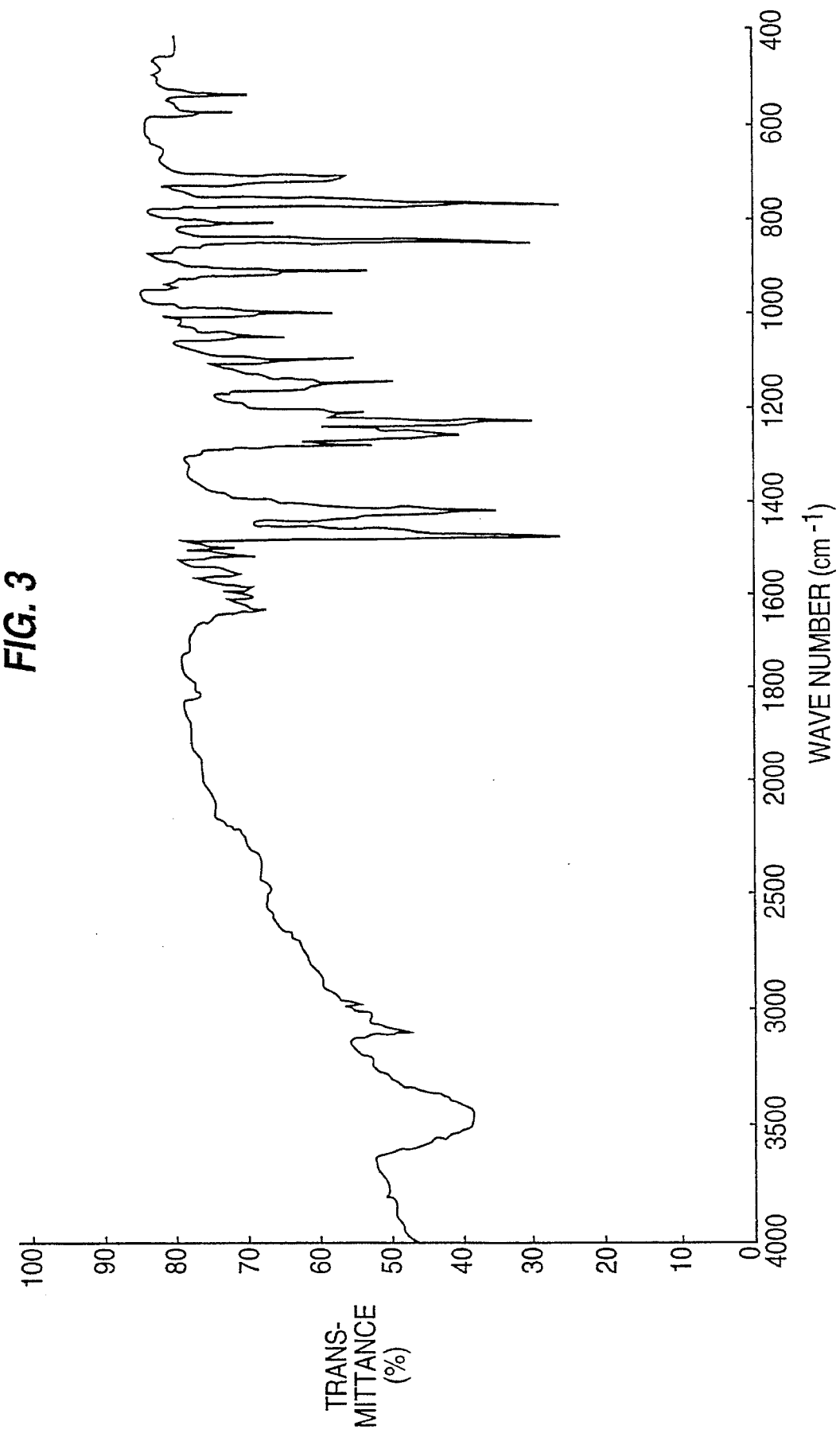
FIGS. 3 and 4 are IR and NMR spectra of one of the polymerizable compounds of the present invention, (N-oxypyridine-2-thio)methylstyrene obtained in Example 3 hereinafter, respectively.
Figure 4:
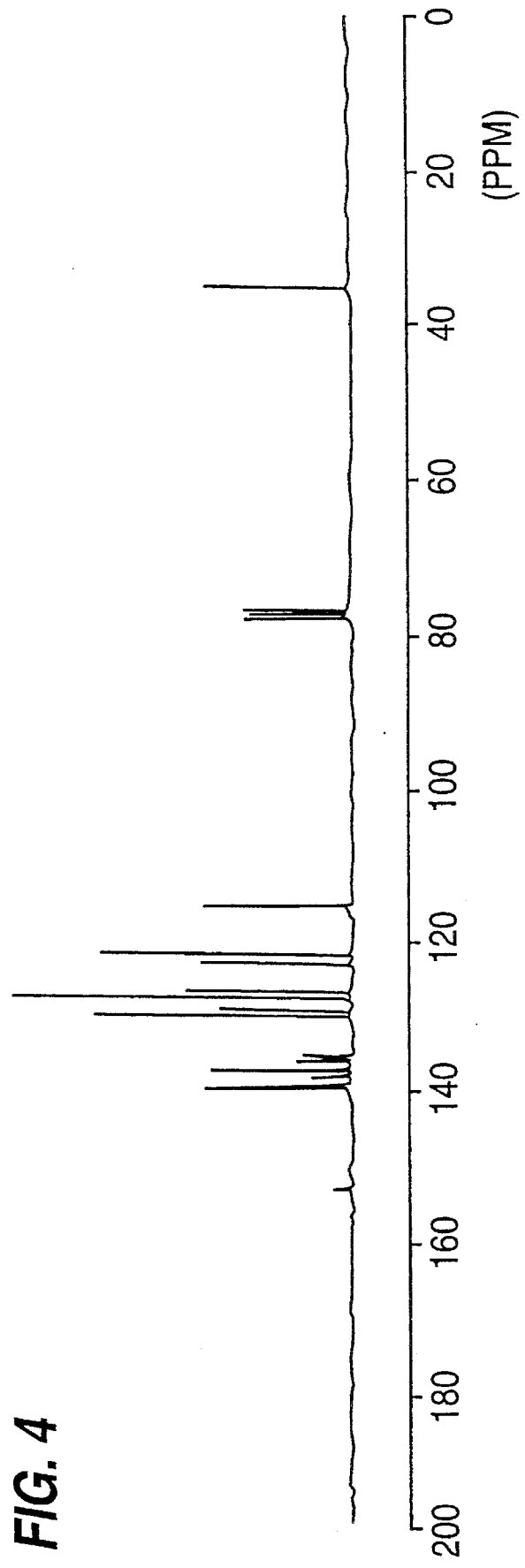

IR and NMR spectra of the resulting compound are shown in Figs. 3 and 4.

EXAMPLE 4

According to the same manner as described in Example 3, pale yellow needle crystals of m.p. of 115°–117° C. were obtained (yield 88%) except that p-chloromethylstyrene was used instead of the mixture of m- and p-chloromethylstyrene. From the elemental analysis and, IR and $^{13}$C-NMR spectra, the resulting compound was identified as (N-oxypyridine-2-thio)methylstyrene.

The results of the elemental analysis of the compounds obtained in Examples 3 and 4 are shown in Table 3.

TABLE 3

| | Elemental analysis (%) | | | |
|---|---|---|---|---|
| | C | H | S | N |
| Calcd. Found | 69.14 | 5.35 | 13.17 | 5.76 |
| Example 3 | 68.92 | 5.29 | 13.27 | 5.66 |
| Example 4 | 69.13 | 5.21 | 13.21 | 5.76 |

Mildew resistance test according to JIS-Z-2911 was carried out by using (N-oxypyridine-2-thio)methylstyrene of Examples 3 and 4 and, as a comparative compound, Zincomazine®. The results are shown in Table 4.

TABLE 4

| | Mildew resistance |
|---|---|
| Example 3 | 3 |
| Example 4 | 3 |
| Zincomazine ® | 3 |

As seen from Table 4, no decrease in mildew resistance of the compound of the present invention is observed in comparison with the comparative compound which is a known mildew resistant compound. Since the compound of the present invention can be polymerized in an organic solvent in the presence of 2,2'-azobis-iso-butyronitrile as a catalyst, it can be utilized as a polymerizable monomer in various industrial applications.

EXAMPLE 5

Synthesis of (N-oxypyridine-2-thio)methylstyrene homopolymer (N-oxypyridine-2-thio)methylstyrene (10 g) was placed in a 100 ml four necked flask equipped with a stirrer, a thermometer and a nitrogen inlet. The monomer was dissolved by addition of dimethylacetamide (20 g) at room temperature with blowing nitrogen. Azobis-iso-butyronitrile (AIBN) (0.1 g) was added thereto and dissolved. Then, the polymerization reaction was carried out at 70° C. for 8 hours. After cooling to room temperature, the reaction mixture was poured into water and thoroughly stirred with a homomixer. The reaction mixture was filtered and dried under reduced pressure to obtain the desired mildew resistant homopolymer as pale yellow powder, yield 75%.

Figure 5:
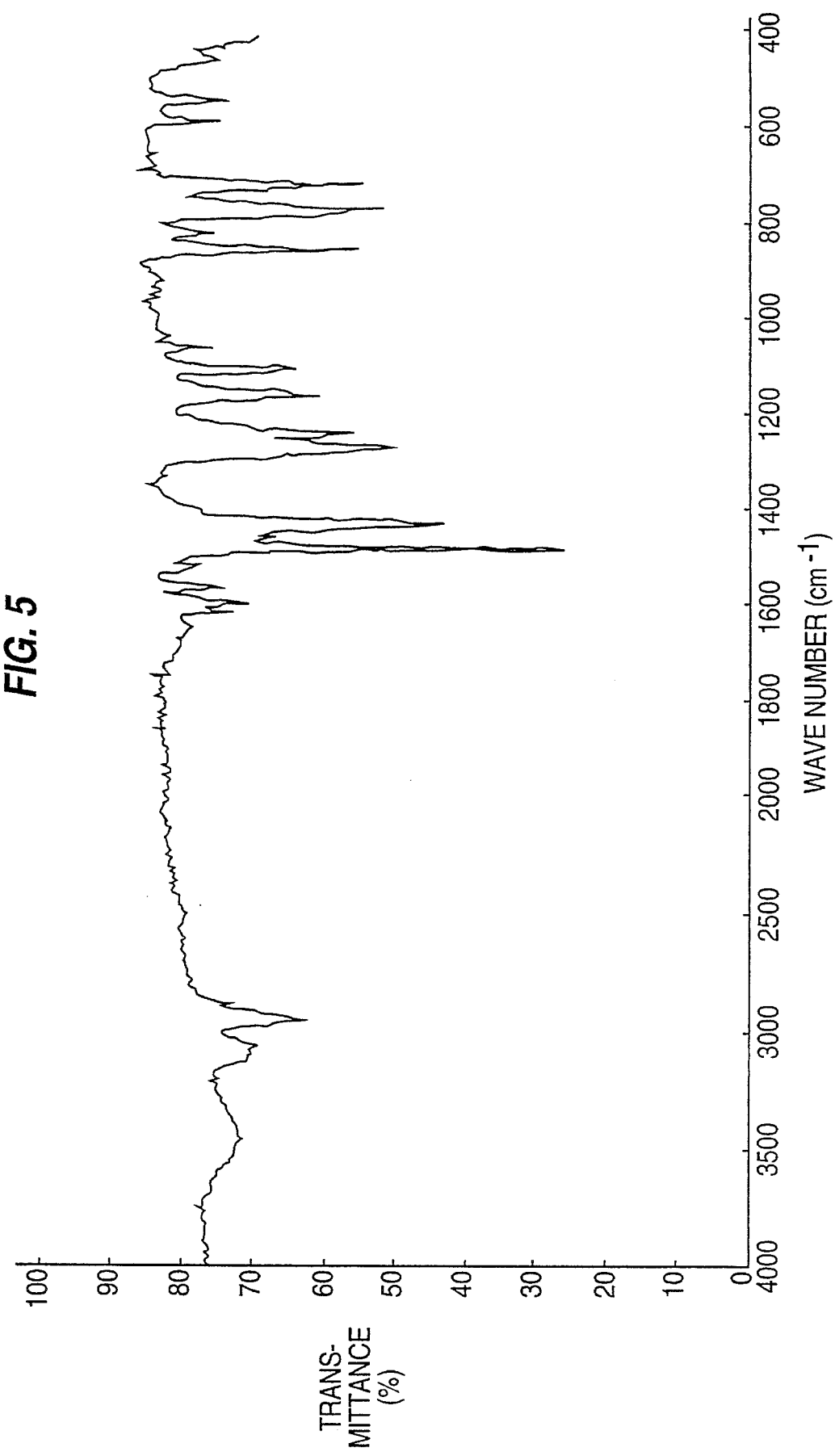
FIG. 5 is IR spectrum of (N-oxypyridine-2-thio)methylstyrene homopolymer obtained in Example 5 hereinafter.

The structure of the product was confirmed by NMR and IR spectra. FIG. 5 shows IR spectrum of this product.

EXAMPLE 6

(N-oxypyridine-2-thio)methylstyrene (10 g, 0.041 mole), chloromethylstyrene (m/p=60/40) (6.3 g, 0.0441 mole), azobis-iso-butyronitrile (0.16 g) were mixed and dissolved. The resulting solution was polymerized at 70° C. for 8 hours. After cooling to room temperature, the reaction mixture was poured into water and thoroughly stirred with a homomixer. The reaction mixture was filtered and dried under reduced pressure to obtain a desired mildew resistant copolymer of (N-oxypyridine-2-thio)methylstyrene and chroromethylstyrene as pale yellow powder.

Figure 6:
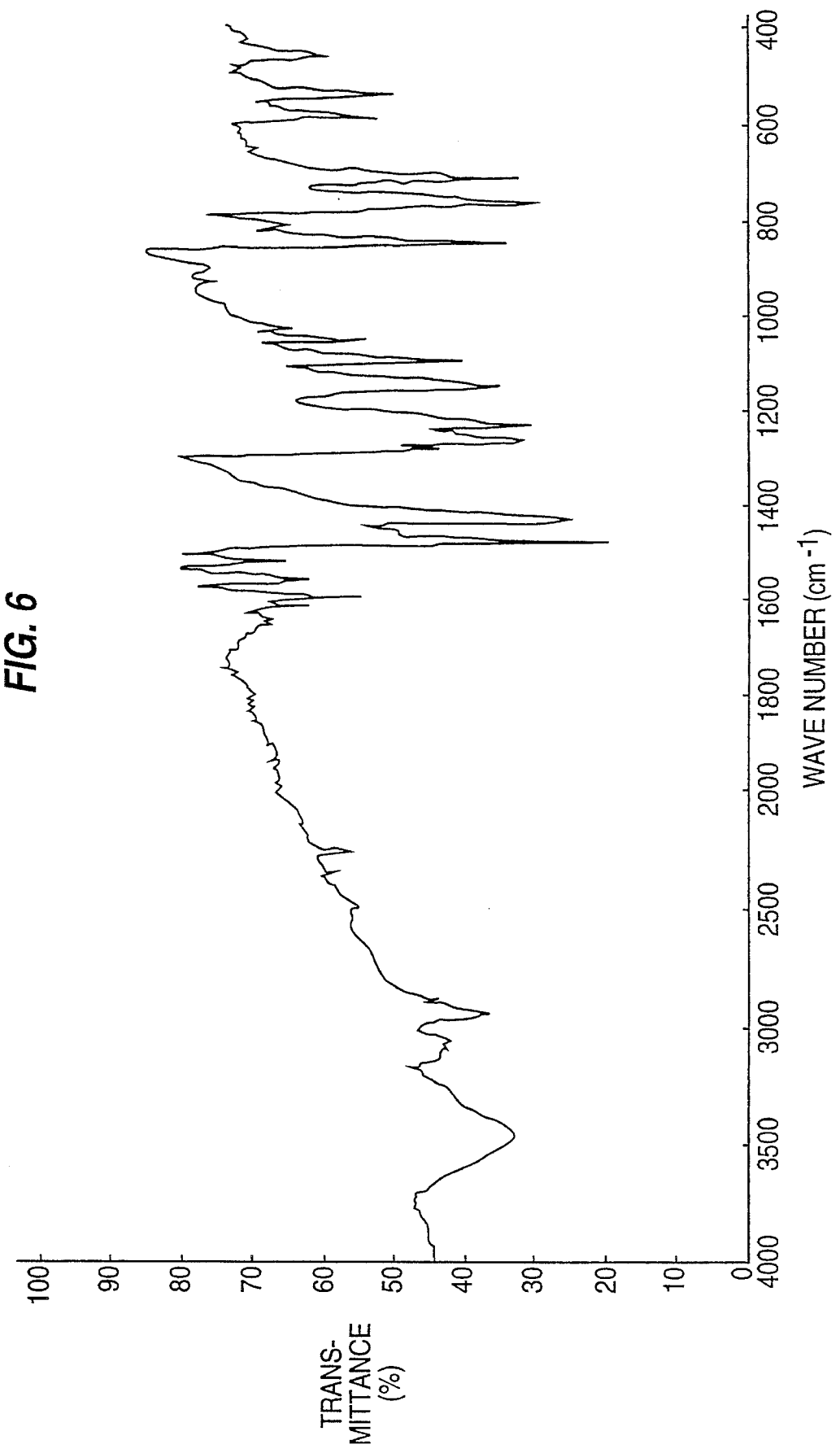
FIG. 6 is IR spectrum of a copolymer of (N-oxypyridine-2-thio)methylstyrene and chloromethylstyrene obtain in Example 6 hereinafter.

IR spectrum of the product is shown in FIG. 6.

EXAMPLE 7

Figure 7:
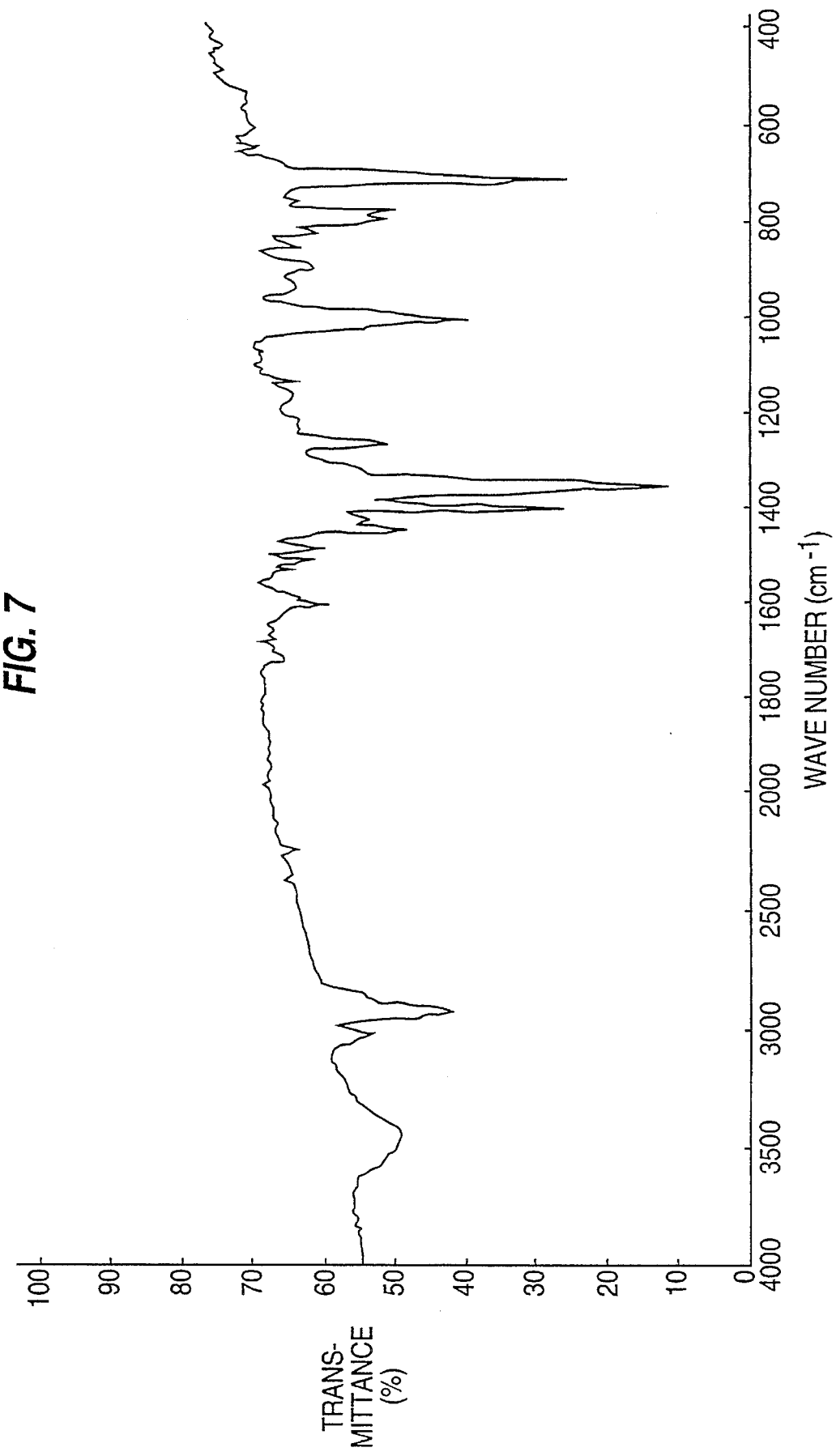
FIG. 7 is IR spectrum of a polymer obtained in Example 7 hereinafter.

Azobis-iso-butyronitrile (0.1 g) was added to (2, 3, 4, 5, 6-pentachlorophenyloxy)methylstyrene as prepared in Example 1 (10 g, 0.026 mole ) and, according to the same manner as described in Example 5, a desired mildew resistant homopolymer of (2, 3, 4, 5, 6-pentachlorophenyloxy)methylstyrene was obtained as brown powder, yield 74%. The structure was confirmed by IR and NMR spectra. FIG. 7 shows IR spectrum of this product.

Comparative Example 1

In a 300 ml four necked flask equipped with a stirrer, a thermometer and a nitrogen inlet, chloromethylstyrene (m/p=60/40) (100 g, 0.655 mole) was placed and it was dissolved by addition of dimethylacetamide (100 g) at room temperature with blowing nitrogen. Azobis-iso-butyronitrile (1 g) was added and dissolved. The mixture was raised to 70° C. and polymerized at this temperature for 9 hours. After cooling to room temperature, the polymer solution was poured into methanol and thoroughly stirred with a homomixer. The solvent was removed and the mixture was filtered and dried under reduced pressure to obtain white powder of a chloromethylstyrene homopolymer, yield 87%. The structure was confirmed by IR and NMR spectra.

Comparative Example 2

According to the same manner as described in Example 6, p-chloromethylstyrene (82.5 g, 0.541 mole) and styrene (18.8 g, 0.181 mole) were polymerized by using azobis-iso-butyronitrile (1 g) to obtain a copolymer of chloromethylstyrene and styrene as white powder, yield 80%. The structure was confirmed by IR and NMR spectra.

Comparative Example 3

According to the same manner as described in Example 6, chloromethylstyrene (m/p=60/40) (82.5 g, 0.541 mole) and acrylonitrile (9.6 g, 0.181 mole) were polymerized by using azobis-iso-butyronitrile (0.9 g) to obtain a copolymer of chloromethylstyrene and acrylonitrile as white powder, yield 85%. The structure was confirmed by IR and NMR spectra.

EXAMPLE 8

A chloromethylstyrene (m/p=60/40) homopolymer (5 g) was placed in a 200 ml four necked flask equipped with a stirrer, a thermometer and a nitrogen inlet and dimethylformamide (45 g) was added thereto to dissolve the homopolymer at room temperature. A solution of Na-PCP (7g) in dimethylformamide (100 g) was gradually added dropwise. After completion of addition, the mixture was raised to 70° C. and reacted at this temperature for 5 hours with blowing nitrogen. After reaction, the mixture was cooled to room temperature and poured into water. The mixture was thoroughly stirred with a homomixer and filtered and washed. After removal of the solvent, the mixture was dried under reduced pressure to obtain a desired mildew resistant polymer as brown powder, yield 70%. The structure was confirmed by IR and NMR spectra and elemental analysis. As the result, it was found that 60% of the homopolymer was reacted.

EXAMPLE 9

According to the same manner as disclosed in Example 8, the copolymer of p-chloromethylstyrene obtained in Comparative Example 2 (5 g) and an aqueous sodium-2-pyridinethiol-1-oxide solution (10 g) were reacted to obtain a desired mildew resistant polymer as pale yellow powder, yield 65%. The structure was confirmed by IR, NMR and elemental analysis. As the result, it was found that all the chloromethyl moieties in the copolymer were reacted.

EXAMPLE 10

According to the same manner as disclosed in Example 8, the copolymer of chloromethylstyrene (m/p=60/40) obtained in Comparative Example 3 (5 g) and Na-PCP (7 g) were reacted to obtain a desired mildew resistant polymer as light brown powder, yield 68%. The structure was confirmed by IR, NMR and elemental analysis. As the result, it was found that 50% of the chloromethyl moieties were reacted.

In Table 5, there are shown weight average molecular weights of the products obtained in Examples 5 to 10 and Comparative Examples 1 to 3 determined by GPC.

TABLE 5

| Product | Weight average molecular weight |
| --- | --- |
| Example 5 | 9,000 |
| Example 6 | 27,000 |
| Example 7 | 1,300 |
| Comparative Example 1 | 65,000 |
| Comparative Example 2 | 58,000 |
| Comparative Example 3 | 55,000 |
| Example 8 | 60,000 |
| Example 9 | 56,000 |
| Example 10 | 54,000 |

Mildew resistance test according to JIS-Z-2911 was carried out by using the products of Examples 5 to 10 and Comparative Examples 1 to 3 and, as comparative compounds, Zincomazine and Na-PCP. The results are shown in Table 6.

TABLE 6

| | Mildew resistance |
| --- | --- |
| Example 5 | 3 |
| Example 6 | 3 |
| Example 7 | 3 |
| Comparative Example 1 | 1 |
| Comparative Example 2 | 1 |
| Comparative Example 3 | 1 |
| Example 8 | 3 |
| Example 9 | 3 |
| Example 10 | 3 |
| Zincomazine | 3 |
| Na-PCP | 3 |

As seen from Table 6, no decrease in mildew resistance of the polymer of the present invention is observed in comparison with the comparative compounds which are known low molecular weight mildew resistant compounds. Thus, the mildew resistant polymer of the present invention can be utilized as a mildew proofing polymer in various industrial applications.

Water (15 ml) adjusted to a prescribed pH was added to each (0.5 g) of the polymers obtained in Examples 9 and 10, and the mixture was maintained at 40° C. with stirring occasionally. After a prescribed period of time, the aqueous phase was filtered off and mold present in the aqueous phase was analyzed by using a spectrophotometer (Hitachi 200-20, UV 370-200). The results are shown in Table 7.

TABLE 7

| | Example 9 | | | Example 10 | | |
| --- | --- | --- | --- | --- | --- | --- |
| pH | 3 | 7 | 9.5 | 3 | 7 | 9.5 |
| Days | | | | | | |
| 1 | ND* | ND | ND | ND | ND | ND |
| 25 | ND | ND | ND | ND | ND | ND |
| 50 | ND | ND | ND | ND | ND | ND |

*no mold was detected.

As seen from Table 7, it was found that the mildew resistant polymer of the present invention is stable against hydrolysis under various pH conditions. By the way, mildew resistance of each polymer after 25 and 50 days was 3.

EXAMPLE 11

Dimethylformamide (275 parts) was added to a polyester diol having the molecular weight of 4,000 (adipic acid: ethylene glycol: 1,4-butanediol=1.00:0.64: 0.55) (555 parts) and 4,4'-diphenylmethane diisocyanate (87 parts) and the mixture was reacted at 50° C. for 40 minutes to obtain a prepolymer having isocyanate groups at both terminal ends. Dimethylformamide (898 parts) was added to the prepolymer to obtain a homogeneous solution. The solution was cooled to 5° C. and, while maintaining at this temperature, a solution of 1,2-propylene diamine (14 parts ) in dimethylformamide (184 parts) was added to the solution to effect chain growth. After addition of 95% of 1,2-propylene diamine solution, a solution of monoethanolamine (2 parts) in dimethylformamide (20 parts) was added to block free isocyanate in the polymer solution. Then, acetic anhydride (3 parts) dissolved in dimethylformamide (20 parts) was added to stabilize viscosity of the polymer solution. The polymer solution thus obtained had the solids content of 32% and viscosity of 2,200 poise at 25° C. This solution was used as the dope A in the Examples hereinafter.

EXAMPLE 12

According to the same manner as described in Example 6, (N-oxypyridine-2-thio)methylstyrene as prepared in Example 3 (10 parts) and acrylonitrile (3 parts) were polymerized to obtain a desired pale yellow mildew resistant copolymer. The structure was confirmed by IR and NMR spectra.

EXAMPLE 13

Chloromethylstyrene (m/p=60/40) (82.5 g, 0.541 mole ) and styrene (18.8 g, 0.181 mole ) were placed in a 300 ml four necked flask equipped with a stirrer, a thermometer and a nitrogen inlet and the mixture was dissolved by addition of dimethylformamide (100 parts) at room temperature with blowing nitrogen. Then, the mixture was raised to 70° C. and polymerized at this temperature for 8 hours. After cooled to room temperature, the polymer solution was poured into methanol and thoroughly stirred with a homomixer. The solvent was removed and the mixture was filtered and dried under reduced pressure to obtain a white copolymer.

The copolymer (10 parts ) was dissolved in dimethylformamide (40parts) at room temperature and a solution of Na-PCP (17 parts) in dimethylformamide (70 parts) was gradually added dropwise. After completion of addition, the mixture was raised to 70° C. and reacted at this temperature for 5 hours with blowing nitrogen. After completion of the reaction, the mixture was cooled to room temperature and poured into water. The mixture was thoroughly stirred with a homomixer. After filtration, washing and removal of the solvent, the residue was dried under reduced pressure to obtain a desired mildew resistant polymer as pale yellow powder. The structure was confirmed by IR and NMR spectra as well as elemental analysis.

In Table 8, there are shown molecular weights and contents of mildew resistant components of the polymers obtained in Examples 5, 12 and 13.

TABLE 8

|  | M.W.* | Content of mildew resistant component (%) |
|---|---|---|
| Example 5 [homopolymer of (N-oxypyridine-2-thio)-methylstyrene] | 9,000 | 52 |
| Example 12 [copolymer of (N-oxypyridine-2-thio)-methylstyrene/acrylonitrile (50/50)] | 22,500 | 48 |
| Example 13 [terpolymer of (2,3,4,5,6-pentachloro-phenoxy)methylstyrene/ chloromethylstyrene/styrene (36/34/30)] | 27,100 | 43 |

*weight average molecular weight determined by GPC

EXAMPLE 14

The mildew resistant polymer of Example 5, 12 or 13 was added to the dope A of Example 11 in an amount of 0.0001%, 0.001%, 0.01%, 0.1% or 1.0% calculated as the mildew resistant component. Further, 1, 3, 5-tris(4-t-butyl-3-hydroxy-2,6-dimethylbenzyl)isocyanuric acid (0.16 part) was added per 100 parts of the above dope. The mixture was subjected to conventional dry spinning to obtain polyurethane elastomer fibers of 55 denier. By using the fibers thus obtained, a knit was prepared and the knit was subjected to mildew resistance test. The results thereof are shown in Table 9 together with the retention of remaining tenacity and the degree of discoloration. The similar data of Comparative Examples 4 and 5 are also disclosed in Table 9.

Comparative Example 4

2-(4-Thiazolyl)benzimidazole was added to the dope A of Example 11 in an amount of 0.0001%, 0.01%, 0.1% or 0%. Further, 1, 3, 5-tris(4-t-butyl-3-hydroxy-2, 6-dimethylbenzyl)isocyanuric acid (0.16 part) was added per 100 parts of the above dope. According to the same manner as described in Example 14, polyurethane elastomer fibers of 55 denier were obtained.

Comparative Example 5

1, 3, 5-Tris(4-t-butyl-3-hydroxy-2,6-dimethylbenzyl)isocyanuric acid (0.16 part) was added to the dope A of Example 11 (100 parts). According to the same manner as described in Example 14, polyurethane elastomer fibers of 55 denier were obtained.

TABLE 9

| | Amount of mildew resistant (%) | Mildew resistance | | Retention of remaining tenacity (%) | | Discoloration ($\Delta b$) | |
|---|---|---|---|---|---|---|---|
| | | A* | B* | A | B | A | B |
| Ex. 5 | 0.0001 | 1 | 1 | 0 | 0 | >20 | >20 |
| | 0.001 | 2 | 2 | 60 | 59 | 13 | 13 |
| | 0.01 | 3 | 3 | 95 | 96 | 5 | 5 |
| | 0.1 | 3 | 3 | 97 | 95 | 3 | 4 |
| | 1.0 | 3 | 3 | 96 | 97 | 4 | 4 |

TABLE 9-continued

| | Amount of mildew resistant (%) | Mildew resistance | | Retention of remaining tenacity (%) | | Discoloration ($\Delta b$) | |
|---|---|---|---|---|---|---|---|
| | | A* | B* | A | B | A | B |
| Ex. 12 | 0.0001 | 1 | 1 | 0 | 0 | >20 | >20 |
| | 0.001 | 2 | 2 | 58 | 61 | 13 | 12 |
| | 0.01 | 3 | 3 | 96 | 95 | 4 | 4 |
| | 0.1 | 3 | 3 | 94 | 96 | 3 | 4 |
| | 1.0 | 3 | 3 | 95 | 94 | 3 | 4 |
| Ex. 13 | 0.0001 | 1 | 1 | 0 | 0 | >20 | >20 |
| | 0.001 | 2 | 2 | 61 | 58 | 12 | 13 |
| | 0.01 | 3 | 3 | 96 | 95 | 4 | 5 |
| | 0.1 | 3 | 3 | 95 | 97 | 5 | 3 |
| | 1.0 | 3 | 3 | 97 | 97 | 3 | 4 |
| Comp. Ex. 4 | 0.0001 | 1 | 1 | 0 | 0 | >20 | >20 |
| | 0.001 | 1 | 1 | 0 | 0 | >20 | >20 |
| | 0.01 | 1 | 1 | 0 | 0 | >20 | >20 |
| | 0.1 | 2 | 1 | 57 | 55 | 15 | 16 |
| | 1.0 | 2 | 1 | 59 | 58 | 14 | 15 |
| Comp. Ex. 5 | — | 1 | 1 | 0 | 0 | >20 | >20 |

*A: just after preparation of the sample
B: after subjecting home laundry 20 times As seem from Table 9, the amount of the mildew resistant component should be at least 0.001% by weight, preferably, not less than 0.01% by weight. Further, it is clear that the elastomer fibers of the present invention show improved and durable mildew resistance.

EXAMPLE 15

The mildew resistant polymer obtained in Example 5 or 7 was blended with a polyethylene terephthalate resin having the intrinsic viscosity of 0.65 in an amount of 0.05% by weight based on the resin and the blend was molded into a film of 0.25 micron in thickness. Mildew resistance of the resulting film is as shown in Table 10.

TABLE 10

| Mildew resistant polymer | Mildew resistance |
|---|---|
| — | 1 |
| Example 5 | 3 |
| Example 7 | 3 |

What is claimed is:
1. A novel polymerizable compound of the formula:

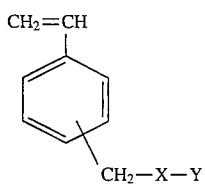

wherein X is —O— or —S—; and XY is a residue of a compound selected from the group consisting of p-chloro-m-cresol, salicylanilide, 8-hydroxyquinoline, 2-(4'-thiazolyl)benzimidazole, 1,2- benzoisothiazolin-3-one, and 2-pyridinethiol-1-oxide.

2. A compound according to claim 1, wherein the —CH$_2$—X—Y moiety is located on m- or p-position of the benzene ring.

3. A compound according to claim 1, wherein X is —O—.
4. A compound according to claim 1, wherein X is —S—.

* * * * *